Dec. 8, 1964  J. H. DEVINE ETAL  3,160,055
TRIPLE LOCKING BLIND BOLT
Filed May 9, 1960  5 Sheets-Sheet 1
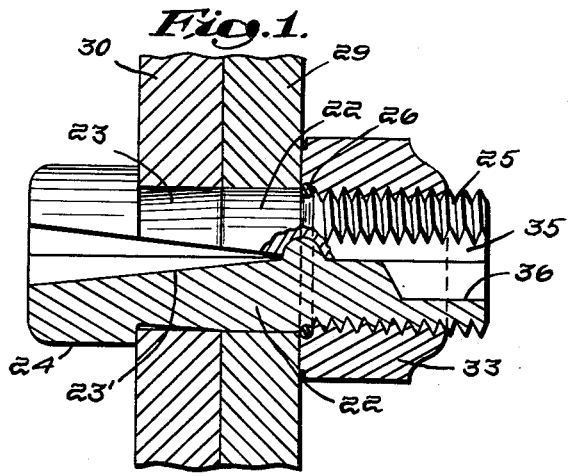
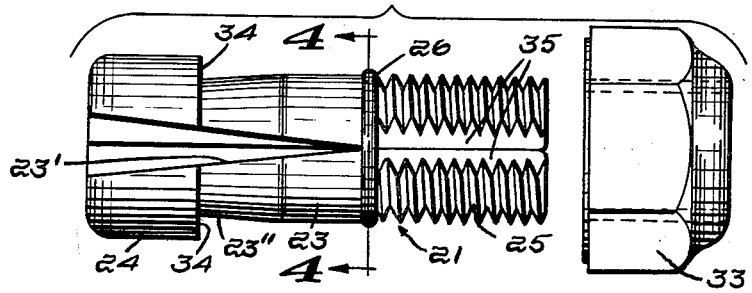
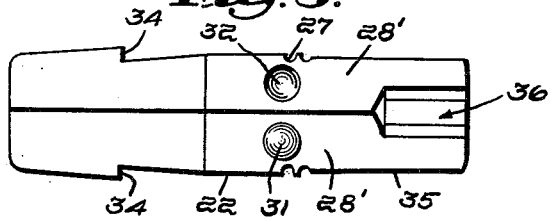
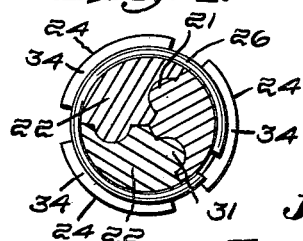
Inventors:
James Henry Devine,
Evelyn Yurcessen Devine,
by Arthur D. Thomson
Attorney

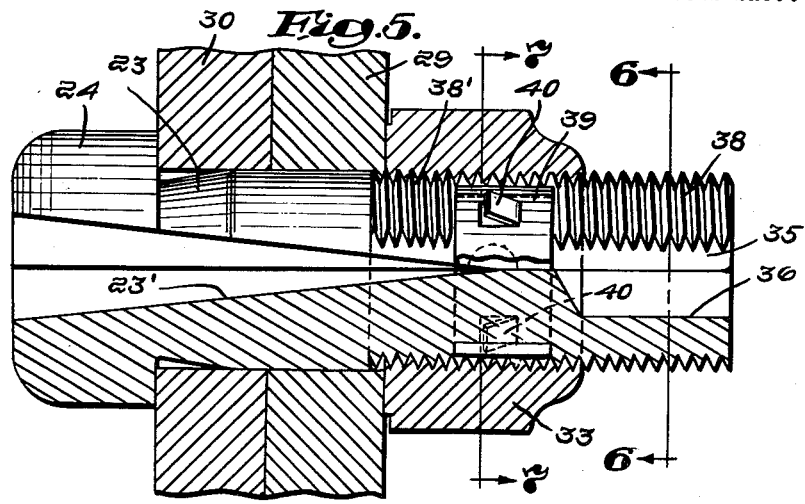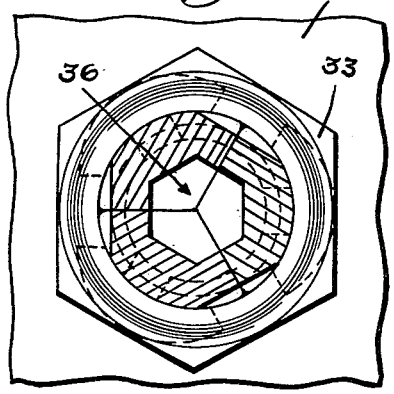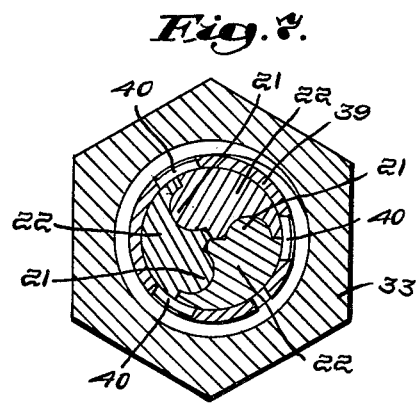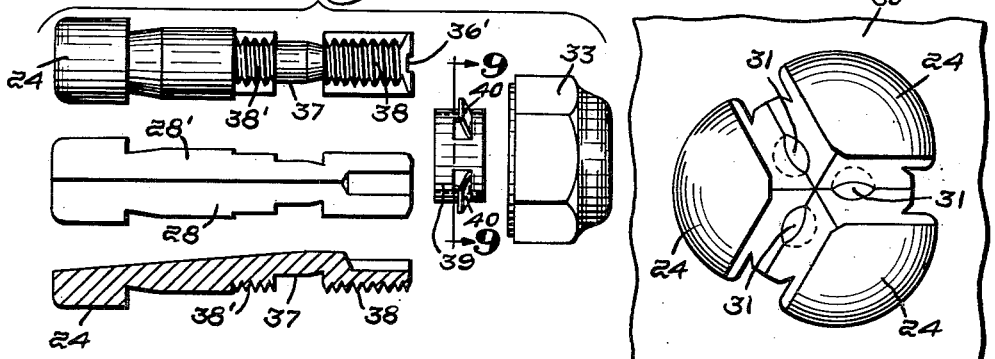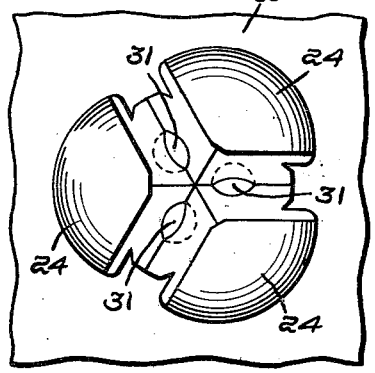

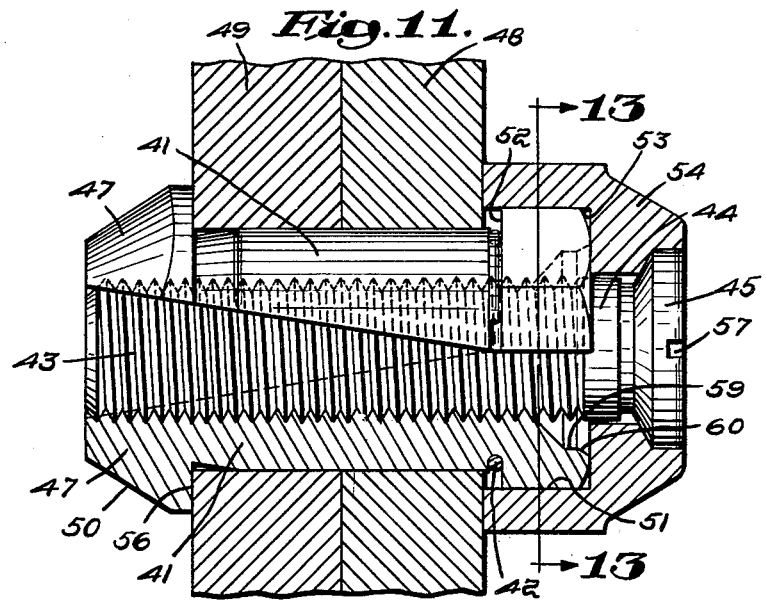
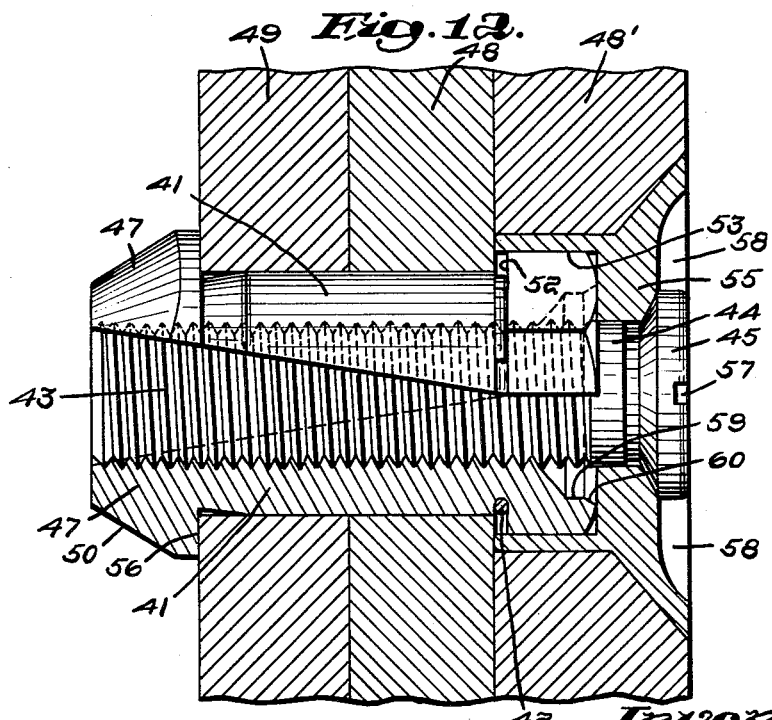

Dec. 8, 1964    J. H. DEVINE ETAL    3,160,055
TRIPLE LOCKING BLIND BOLT
Filed May 9, 1960    5 Sheets-Sheet 4

Inventors:
James Henry Devine,
Evelyn Yurcessen Devine,
by Aubrey D. Thomson
Attorney

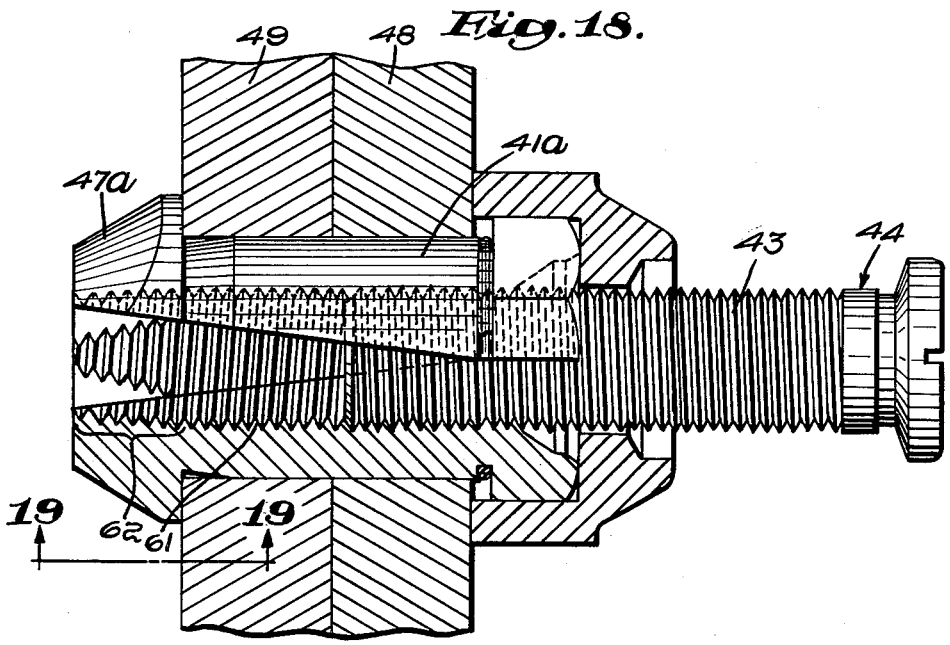
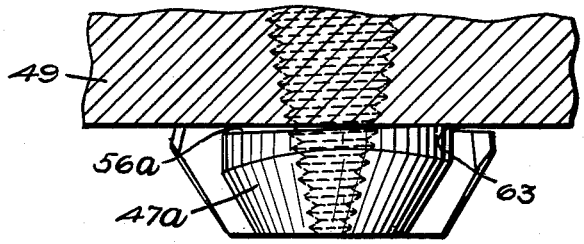
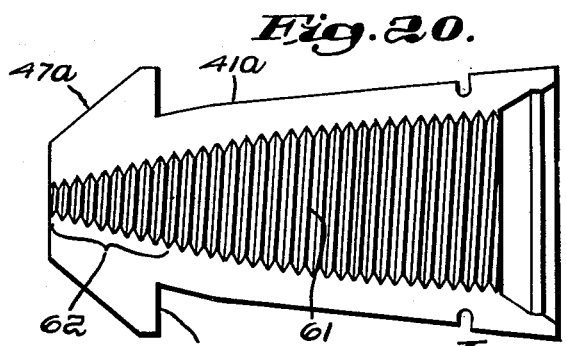

United States Patent Office 3,160,055
Patented Dec. 8, 1964

3,160,055
TRIPLE LOCKING BLIND BOLT
James Henry Devine, Brookline, Mass., and Evelyn Yurcessen Devine, 380 Washington St., Brookline, Mass.; said James Henry Devine assignor to Triple-Lok Trust, Brookline, Mass., a trust of Massachusetts
Filed May 9, 1960, Ser. No. 27,857
10 Claims. (Cl. 85—37)

This invention relates to bolts having a plurality of expandable bolt segments for securing together two or more panels of structural layers of material, irrespective of the accessibility of the outer surface of the innermost of the panels or layers which are to be locked together. Examples of earlier types of such blind bolts are disclosed in Patents Nos. 2,804,796, 2,836,095 and 2,875,674, issued to James H. Devine; and the subject matter of this application embodies improvements on the bolts described and claimed in said patents, and constitutes a transitional development leading to the further improvements disclosed and claimed in applicants' copending application Serial No. 835,580, filed August 24, 1959, now Patent No. 3,096,678.

The segmental blind bolts shown in the aforesaid patents comprise two bolt segments held in cooperative relation by a resilient ring, so that the segments may slide or spread relative to each other, on a pivot disposed in the plane of the encircling ring, from collapsed to expanded position. The inner end of each bolt segment has a projecting toe portion adapted to engage the blind surface of the innermost plate or plane, when expanded; and the outer end of each segment is exteriorly threaded, so that a nut threaded on the contracted outer ends will hold the inner ends of the segments in expanded or locking position, and tighten their toe portions against said blind surface. In No. 2,804,796, the resilient ring provides a projecting stop, when unconstrained, to prevent the bolt from dropping through the aligned holes in plates which are to be bolted together, as well as a means for holding the bolt segments or components in complemental relationship, and a pivot on which the segments are relatively movable.

In each such two segment bolts of the spreading type, the transverse pivoted axis of the bolt segments is diametrically disposed in a longitudinal plane passing through the axis of the bolt between the segments, as well as in the transverse plane of the encircling ring; and the bearing surfaces of the expanded toe portions (hereinafter referred to as the head portions of the bolt segments) are spaced apart on opposite sides of the bolt.

It is accordingly one of the objects of the present invention to provide an expandable blind bolt comprising at least three complemental bolt segments, each having a radially projecting head portion at its inner end, so that the bearing surfaces of the bolt head are more uniformly distributed on the bolted plates, thereby increasing the holding strength of the bolted connection in tension, shear and torque.

Another object of the invention is to provide a bolt comprising at least three complemental segments which are internally threaded to receive a threaded center component which acts to expand the bolt segments and serves as a solid core for the bolt, thereby materially increasing its strength in tension, shear and torque; said center component having a head cooperating with a nut element, of protruding or flush type, to tighten the head portions of the bolt against the inaccessible surface of the plates or panels which are bolted together.

A related object is to provide the outer ends of the bolt segments with external surfaces which interengage with complemental interior surfaces of said nut element, and to provide means for holding the nut element stationary, so that the bolt is restrained from rotation while the center component is being tightened to secure the bolt.

A further object is to provide convenient means for quickly and easily removing the unrestrained bolt from the blind holes, by pressing the head of the removed center component into the outer contracted end of the multi-part bolt, to expand the outer ends of the bolt segments and thereby contract the inner ends or head portions thereof, so that the latter may be withdrawn through said holes.

Additional advantages of the improved bolt constructions herein disclosed will become apparent from the following description of the optional embodiments of the invention which are illustrated in the accompanying drawings, in which:

FIG. 1 is a sectional view, partly in elevation, of one form of a three segment blind bolt in locking position on two connected plates or structural layers;

FIG. 2 is a developed elevation of the bolt assembly and the nut therefor, as shown in FIG. 1;

FIG. 3 is a detail elevation showing the interior surfaces of one of the bolt segments of FIG. 1;

FIG. 4 is a section at the pivot plane of the bolt assembly, taken in line 4—4 of FIG. 2;

FIG. 5 is a view similar to FIG. 1 showing a modification of the bolt assembly;

Figure 13:
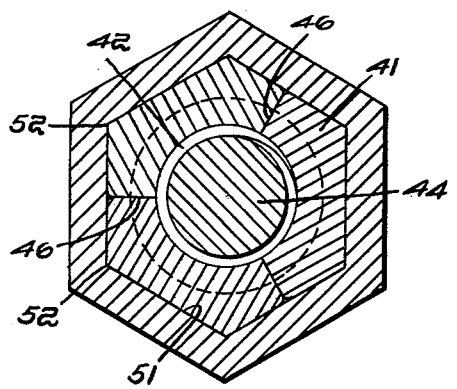
Figure 14:
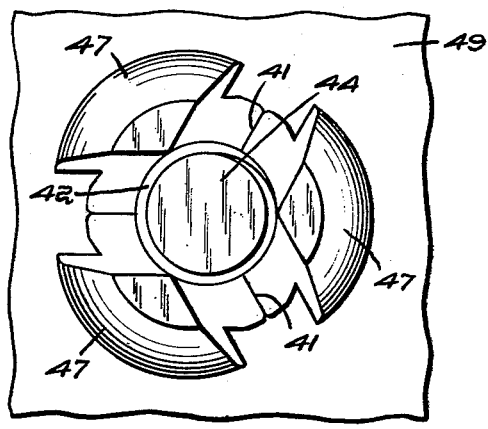
Figure 15:
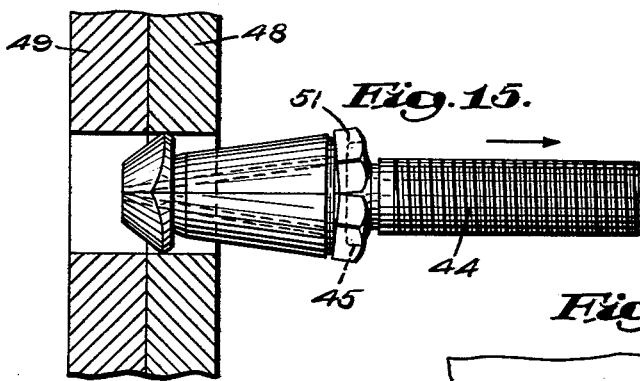
Figure 17:
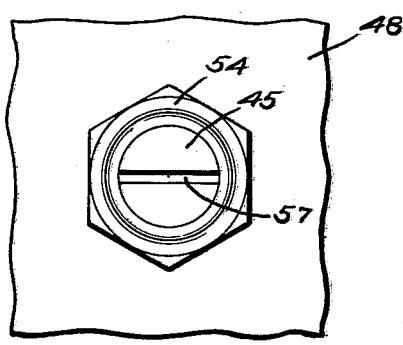
Figure 16:
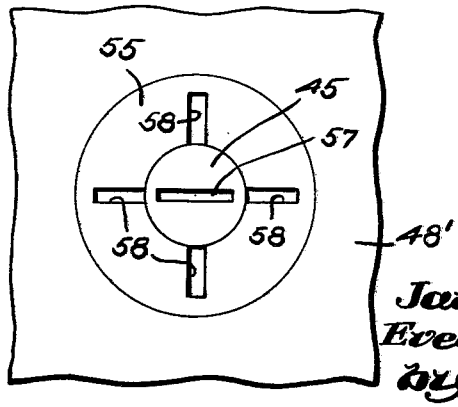

FIGS. 6 and 7 are transverse sections taken on lines 6—6 and 7—7, respectively, of FIG. 5;

FIG. 8 is a developed view of the bolt parts of FIG. 5, with the interfitting ball and socket pivot joints of FIG. 7 omitted, as a further optional modification;

FIG. 9 is a section through a resilient collar, taken on line 9—9 of FIG. 8;

FIG. 10 is a bottom view of the bolt head, looking to the right of FIG. 5;

FIG. 11 is a view similar to FIGS. 1 and 5, showing a modification embodying the aforesaid center component with a protruding type nut;

FIG. 12 is a view similar to FIG. 11, showing an optional, flush type nut;

FIG. 13 is a section in line 13—13 of FIG. 11;

FIG. 14 is a bottom view of the bolt head, looking to the right of FIG. 11 or FIG. 12;

FIG. 15 is an elevation of the bolt assembly with the segment heads contracted during extraction of the bolt by the center component;

FIGS. 16 and 17 are plan views looking to the left of FIGS. 12 and 11, respectively;

FIG. 18 is a view similar to FIG. 11, showing the center component partially threaded into the bolt assembly, and illustrating internal and external modifications of the head portions of the respective bolt segments;

FIG. 19 is a fragmentary section on line 19—19 of FIG. 18; and

FIG. 20 is a plan view of the inner side of one of the bolt segments of FIG. 18.

In the embodiment illustrated in FIGS. 1 to 4, the bolt assembly 21 comprises three identical bolt segments 22, each having a shank portion 23 provided with tapered edges 23' to permit expansion and contraction of the segments, and a relatively short tapered surface 23" adjacent an outwardly projecting head portion 24 to relieve molecular stress when the bolt is in tension; and a resilient, split ring 26 fitting in complemental grooves 27 in each of the segments. The inner side of each segment has flat surfaces 28 and 28' meeting at an angle of 120°, so that the complemental flat surfaces of the respective segments meet in substantially flush relation in the region of the pivot plane (FIG. 4) whether the head ends thereof are expanded to locking position, or contracted together in order to pass through the concentric holes in the plates 29, 30.

The surface 28 may be provided with a rounded projection or half ball 31, to fit in a complemental recess 32 in surface 28' of the adjacent segment, to maintain the segments in correct longitudinal relationship and to provide rocking pivots at the pivot plane. When this pivot plane is disposed inwardly of the ring 26, the head ends 24 are normally expanded, and the threaded outer ends are normally contracted together, as shown in FIG. 2.

When the bolt assembly is inserted as shown in FIG. 1, the head portions 24 are locked in expanded position and tightened against the blind surface of the innermost plate 30 by screwing a nut 33 onto the contracted threaded ends 25. The head portions have arcuate surfaces 34 which bear flatwise on the surface of plate 30, when they are so contracted and locked, to provide three uniformly distributed bearing areas.

The grooves 27 receiving the split ring 26 are relatively shallow, so that the relaxed ring projects outwardly of the body of the bolt assembly and provide a shoulder or stop to prevent the assembly from passing through the plate holes. Thus, the pivot plane of the assembly is maintained at the outer surface of the outermost plate 29.

The threaded outer ends 25 preferably have flat outer surfaces 35 adjacent the inner flats 28 and 28' of each segment, and a non-circular socket 36, which may be hex-shaped, is preferably provided in the outer end of the assembly, to receive a tool end of complemental shape for holding the bolt assembly against rotation while the nut 33 is threaded on and tightened.

The modified embodiment shown in FIGS. 5 to 10 is similar to that first described, but the pivot plane of the bolt assembly is disposed intermediate the threads on the threaded outer ends of the segments; and a relatively wide collar is used in place of the ring 26. The bolt segments, as shown particularly in FIG. 8, are like the segments 23, but relatively longer, and the ball and socket pivot elements 31 and 32 may be omitted in the optional form of FIG. 8.

In the modification, the bolt segments have relatively wide and deep recesses 37 between spaced threaded portions 38 and 38' of their respective outer ends, but the shank portions and head portions are as previously described. A relatively wide split collar 39 fits in the recesses 37 of the assembled segments and holds them in correct assembled relationship, in the region of the pivot plane. The collar is provided with struck out, resilient tabs or tongues 40, inclining inwardly of the assembly and providing stop shoulders for preventing the assembly from passing through the holes in the plates or panels to be bolted together.

The resilient tongues 40 will flex toward the collar under pressure of the advancing nut 33, so that the nut may be threaded past the collar and onto the inner section of threads 38', as shown in FIG. 5. Hence, the modified bolt need not be designed for plates or panels of predetermined total thickness, and may be used in clamping different pairs of plates which vary in total thickness.

The outer end of the bolt assembly may have a hex-shaped socket 36 (FIG. 6), as in FIGS. 1 to 4, or may optionally be formed with a screw driver slot 36' as indicated in the topmost view of FIG. 8, for holding the assembly against rotation while nut 33 is threaded and tightened. The socket 36 of the bolt assembly may also receive a tapered hexagonal tool head, to expand the outer ends of the bolt segments and contract the head portions thereof, after the locking nut has been removed, so that the bolt assembly may be easily withdrawn.

In the embodiments thus far described, the nut member serves not only to embrace the outer ends of the bolt segments and hold them in contracted position, thus maintaining the inner headed end portions in expanded or locking position, but also to tension the nut assembly and clamping the head portions tightly against the blind surface of the innermost plate or panel 30. In the modification shown in FIGS. 11 to 17, however, the nut member serves merely to embrace the outer ends of the bolt assembly, and hold the segment in locking position as aforesaid, and an additional center component threads into the bolt assembly to draw it outwardly and clamp the segment heads against the blind surface. The center component also stresses the bolt segments to expanded position and provides a solid core for the bolt assembly, including the bolt heads, thus adding materially to the holding strength of the multi-part bolt, when locked it is in operative position.

The three bolt segments 41 of FIGS. 11 to 14 are generally similar in shape and operation to the segments described in connection with FIGS. 1 to 4, but the modified bolt assembly, encircled by split ring 42, is hollow and the inner surfaces of the segments are arcuate in cross-section and are threaded to engage the threaded stem 43 of center component 44 having an enlarged head 45. Thus, the complemental, flat bearing surfaces of adjacent segments which meet in the region of the transverse pivot plane, as shown at 46 (FIGS. 13 and 14), are relatively narrow.

In both embodiments, however, the segments pivot relative to each other at rocker points or lines disposed in longitudinal planes radial to the bolt assembly; and when three segments are used, as shown, the radial planes are spaced 120°. The optional interfitting ball and socket pivots of FIGS. 1 to 4 are not used in FIGS. 11 to 14, and are not necessary in any case.

As before, the split ring 42 is disposed in complemental exterior grooves of the bolt segments, at or slightly outwardly of the transverse pivot plane, so that the inner ends of the segments carrying the head portions 47, are normally expanded and the outer ends thereof are normally contracted, whether or not the bolt assembly is inserted in the holes of the plates to be bolted together, such as the plates 48 and 49 of FIG. 11. As shown in that figure, the outer surfaces of the head portions 47 are inclined at 50 to provide an angle of entry, so that the bolt heads are automatically contracted when the bolt assembly is pressed into and through the holes in the plates.

In FIGS. 11 to 14, the recess for resilient ring 42 is relatively deep, so that the ring is disposed within the groove and does not project outwardly as a stop shoulder. In this modified embodiment, the outer ends of the bolt segments are enlarged to provide a projecting flange or collar 51 which is preferably hex-shaped when said ends are contracted (FIG. 13), to provide pointed shoulders 52 which serve as stops to prevent the assembly from passing through the holes in said plates.

The hex-shape of the contracted outer end of the bolt assembly also fits a complemental recess 53 of a protruding type nut member 54 (FIG. 11), or of a flush type nut member 55 (FIG. 12), so that such nuts hold the outer ends of the segments expanded, as aforesaid. The interfitting relation also prevents relative rotation between the nut member and the bolt assembly.

Each of the nut members is centrally apertured to receive the associated center component 44 which passes freely through such openings and threads into the bolt assembly to force the bolt segments to fully expanded position and clamp the head faces 56 flatwise against the blind surface of the innermost plate 49. When the center component is fully tightened, its head 45 bears against a surface of the nut member which, in turn, bears on a surface of outermost plate 48 or 48', as shown in FIGS. 11 and 12.

It will be observed that the threads on the inner surfaces of the respective segments extend inwardly of the bolt assembly to the inner ends of the head portions of the segments; and that when the center component is threaded fully into the assembly and tightened, its threaded stem 43 extends through said head portions. Thus, when the bolt parts are tensioned in locking position, the center component provides a solid core for the bolt, and materially strengthens the bolted connection.

Head 45 preferably has a cross slot 57, so that the center component may be threaded and tightened by a screw driver, and the associated nut is provided with formations for receiving a tool for holding the nut and the bolt assembly, keyed thereto, against rotation while the center component is tightened. For example, the protruding nut member 54 may have a hex-shaped periphery (FIG. 17) for a wrench, and the flush type nut member 55 may have surface slots 58 (FIGS. 12 and 16) to receive the prongs of a spanner type wrench.

To permit quick and easy extraction of the bolt assembly from the holes of the plates, the outer, flanged ends 51 of the bolt segments are shaped to provide a central, annular recess 59 when said outer ends are contracted, the diameter of said recess or socket being slightly less than the diameter of the head 45 of the center component. Outwardly of said annular socket, the multipart wall of the recess is flared at 60 to lead the head 45 into said socket when inserted under pressure.

Thus, when the head of the removed center component is pressed into the flared mouth of the recess to seat in the annlar socket 59 the outer, flanged ends of the bolt segments will be expanded and the inner headed ends of the segments will be contracted, so that the bolt assembly may be withdrawn as shown in FIG. 15. The assembly may be inserted in similar fashion, if desired, but it is unnecessary to use the center component for that purpose, because the inclined surface 50 of the head portions will lead the assembly into the hole, and inward pressure will cause the bolt heads to contract and slide through the holes of the plates to be clamped.

With the triple locking blind bolt herein disclosed, and more particularly the embodiment shown in FIGS. 11 to 17, two or more plates, panels or other structural layers may quickly and securely be bolted together, and easily unbolted, by one man operating on one side of the structure, with simple tools and a minimum of time and effort. It will be understood that the components of the improved bolts may be made in various sizes suitable for the intended purpose, and that the structural details of the embodiments herein illustrated and described may be varied to suit particular installations without departing from the essence of this invention as set forth in the following claims.

In the further modification shown in FIGS. 18 to 20, the internal and external forms of the head portions 47a of the respective bolt segments 41a are varied in order to further increase the security of the tightened bolt by inhibiting accidental rotation of its center component and its bolt assembly.

As indicated in FIG. 18, the threaded inner surface 61 of the respective bolt segments is inwardly tapered or inclined in the region of bolt head 47a, at 62, with respect to the threaded surface along the body of each segment. The degree of inward inclination is very small, for example an angle of 1 or 2 minutes, but is sufficient to cause the inthreaded center component 44 to wedge the head portions 47a slightly apart when the center component is tightened to locking position. Thus, the inner end of the center component is securely gripped by the heads of the bolt segments, and its asscidental rotation is effectively restrained under vibratory stresses.

As best shown in FIG. 19, the bearing face 56a of each bolt segment is inclined in a plane disposed at a slight angle to a plane normal to the axis of the bolt, so that said face also slightly inclined with respect to the free surface of the innermost plate 49 (FIG. 18) until the center component is fully tightened, as aforesaid. When so tightened, the bearing face of the head of each bolt segment is drawn against said surface of plate 49, the narrow gap (exaggerated at 56a in FIG. 19) is closed, and the opposite corner 63 of the projecting head bites into said surface, and securely locks the bolt assembly against accidental rotation.

It will be apparent that the tapering of the threaded surface of the bolt segments and the inclination of the bearing surfaces of the head portions thereof, jointly and severally, ensure that the threads of the segments are effectively locked with complemental threads of the center component without galling, thus obviating the need of lock washers or lock nuts.

We claim:

1. A blind bolt for clamping together structural plates having concentric openings therethrough, when the blind surface of the innermost plates is inaccessible, the bolt being insertable through said openings and comprising an expandable and contractable bolt assembly having at least three similar and complemental segments pivotally movable angularly relative to each other and in a radial direction with respect to the axis of the assembly, from locking to unlocking positions, and having a resilient member embracing the segments adjacent a transverse pivotal plane; the respective segments having tapered shank portions of arcuate cross section, extending inwardly of said transverse plane, and terminating in outwardly flanged head portions adapted to engage said blind plate surfaces when the shank portions of the inserted assembly are expanded to locking position, said segments having opposite end portions extending outwardly of said transverse plane, said outer end portions being contracted together when the shank portions are expanded; the respective segments having relatively narrow edge surfaces engageable with complemental surfaces of adjacent segments in radial planes, in the region of said transverse pivotal plane, and the inner arcuate surfaces of their shank portions having complemental threads; a nut member adapted to fit over and engage complemental surfaces of the contracted outer end of the bolt assembly for holding the head portions in locking position, and having an inner end adapted to bear against a surface of the outermost plate; and a center component having a head engageable with said nut member and a threaded stem insertable into said bolt assembly and engageable with the threads of said segments when screwed therein, thereby to expand the shank portions and draw the head portions of the segments into tight locking engagement with the blind surface of the innermost plate.

2. A blind bolt as described in claim 1, the threads on the inner surfaces of the respective segments extending inwardly of the bolt assembly, at least to the head portions thereof, and the threaded stem of the center component extending inwardly of the assembly and into said head portions, thereby to provide a solid core for the bolt when the parts are tensioned in locking position.

3. A blind bolt as described in claim 1, the head portions of the respective segments having inclined outer surfaces tapering toward the inner ends of the segments to provide an angle of entry, whereby said head portions are contracted when the bolt assembly is pressed into and through said plates.

4. A blind bolt as described in claim 1, said nut member and the contracted outer end of the bolt assembly having interengaging non-circular surfaces to restrain relative rotational movement therebetween.

5. A blind bolt as described in claim 1, said nut member protruding outwardly of the outermost plate and having a non-circular interior surface engaging a complemental exterior surface of the contracted outer end of the bolt assembly to restrain relative rotational movement between said interfitted parts, the nut member having a non-circular exterior surface engageable by a holding tool whereby the nut member and bolt assembly may be held stationary while the center component is threaded into and out of the bolt assembly.

6. A blind bolt as described in claim 1, said nut member having an outer surface flush with the exposed surface of the outermost plate, and having a non-circular interior surface engaging a complemental exterior surface of the contracted outer end of the bolt assembly to restrain relative rotational movement between said interfitted parts, the said outer nut surface having recesses engageable by a holding tool, whereby the nut member and bolt assembly may be held stationary while the center component is threaded into and out of the bolt assembly.

7. A blind bolt as described in claim 1, the outer ends of the respective segments having outward projections forming stop shoulders for preventing the bolt assembly from passing through said plate openings.

8. A blind bolt as described in claim 7, the contracted outer end of the bolt assembly having a composite socket adapted to receive the head of the inverted center component when the head is forced into the socket to expand the outer ends of the segments and contract the inner head portions thereof, said socket being smaller in diameter than said head and resiliently embracing said head whereby the bolt assembly may be withdrawn from the plate openings by the center component.

9. A blind bolt as described in claim 8, the mouth of said composite socket being flared to lead the said head into the socket, and the walls of the expanded socket being cylindrical so that said head is releasibly restrained therein by the action of the resilient member which embraces the segments.

10. A blind bolt for claimping together structural plates having concentric openings therethrough, irrespective of the accessibility of the opening in the innermost plate, the bolt being insertable through said openings and comprising an expandable and contractable bolt assembly having at least three similar and complemental segments movable angularly relative to each other and radially with respect to the axis of said openings from unlocking position to locking position, and having a resilient member embracing the segments and holding them in assembled relation; each segment having a shank portion of generally arcuate cross-section and an interior arcuate surface provided with screw threads, and having a head portion projecting outwardly at the inner end of the shank portion, the head portion having an arcuate interior surface formed with screw threads as a construction of the threads of the shank portion, and having a flat exterior surface adapted to bear against the surface of the innermost of said plates when the segments are expanded to locking position; and a screw-threaded center component adapted to thread into said bolt assembly to expand said segments and clamp the head portions thereof in locking position against the said surface of the innermost plate; and means restraining relative rotation between the inthreaded center component and the bolt assembly, to hold the bolt in locking position; said restraining means comprising an inclination of the flat bearing surface of at least one segment head portion with respect to a plane normal to the axis of the bolt.

References Cited in the file of this patent
UNITED STATES PATENTS

| | | |
|---|---|---|
| 594,526 | Glauber | Nov. 30, 1897 |
| 2,043,861 | Neal | June 9, 1936 |
| 2,333,290 | Brackett | Nov. 2, 1943 |
| 2,393,606 | Brush | Jan. 29, 1946 |
| 2,804,796 | Devine | Sept. 3, 1957 |
| 3,096,678 | Devine | July 9, 1963 |